C. A. FENNER.
Jig-Saws.
No. 156,417.    Patented Nov. 3, 1874.
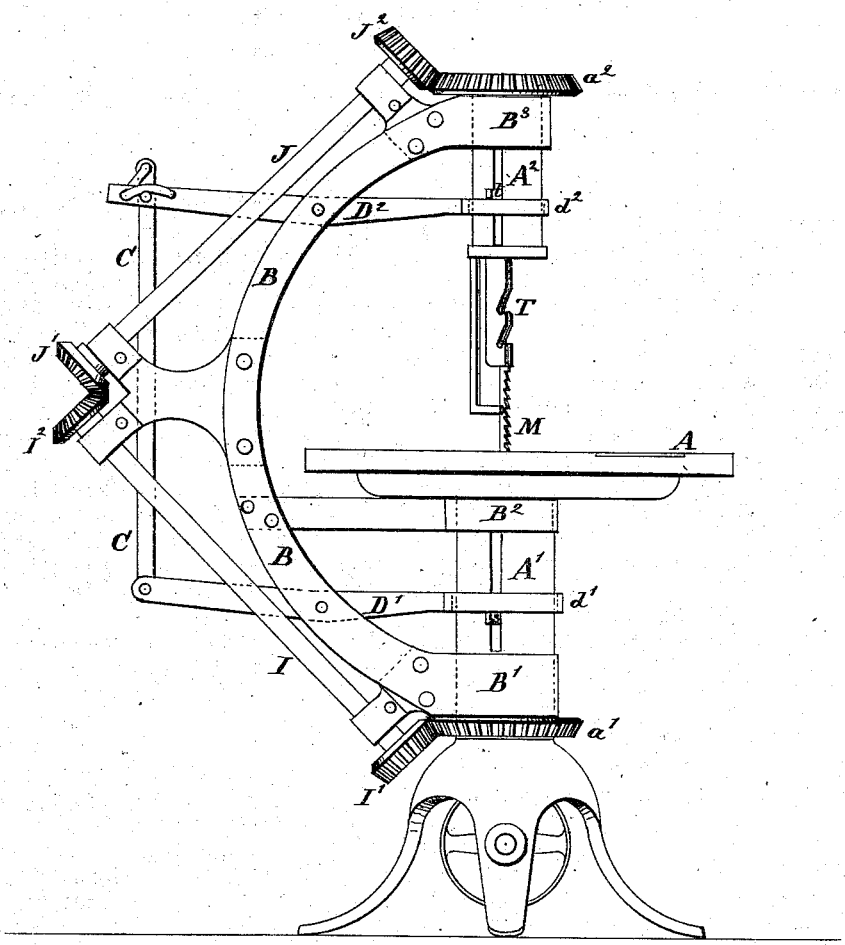

UNITED STATES PATENT OFFICE.

CHARLES A. FENNER, OF MYSTIC BRIDGE, CONNECTICUT, ASSIGNOR TO HIMSELF AND HORACE W. FISH, OF NEW YORK, N. Y.

IMPROVEMENT IN JIG-SAWS.

Specification forming part of Letters Patent No. 156,417, dated November 3, 1874; application filed March 27, 1874.

*To all whom it may concern:*

Be it known that I, CHARLES A. FENNER, of Mystic Bridge, New London county, Connecticut, have invented certain Improvements in Jig-Saws, of which the following is a specification:

The object of the invention is to provide more perfectly than heretofore for supporting the head of the saw, while allowing the connecting-frame which supports the levers, or analogous devices for communicating motion, to be swung around out of the way, and stand at will on different sides of the table in sawing difficult patterns.

In my improved machine the saw presents its cutting-edge always in the same direction. It is reciprocated actively always in the same position. The table also is fixed, and the work is turned in various positions thereon, as required. In the patent issued to myself and another, dated February 13, 1872, No. 123,561, we set forth means for allowing the supporting-frame to be swung around into various positions; but the head which supported the upper work of the saw required to be supported from above. The machine served very successfully in buildings where there were firm floor-timbers overhead, but in many instances such support is not available, and for all purposes it is preferable to make the machine entirely self-dependent. The present invention attains this end very completely.

The following is a description of what I consider the best means of carrying out the invention. The accompanying drawing forms a part of this specification, and is a side elevation of the machine.

A is a fixed horizontal table, firmly supported on a column, $A^1$, with legs as represented, which column is of sufficient length to form suitable bearings sufficiently separated to firmly support the swinging frame B, which supports all the machinery. The lower bearing $B^1$ encircles the column near the base. The upper bearing $B^2$ encircles the column immediately under the table A. The frame B and its connections are capable of being turned or swung freely around on the column $A^1$, as a center. Its upper end forms a stout and sufficiently long bearing, $B^3$, to support the head $A^2$.

Means for imparting motion to the saw under such conditions are described in detail in the patent of 1872, above referred to, and are represented somewhat modified in the figure hereto annexed. For a brief description I may say that a cranked shaft gives reciprocating motion through a pitman to a slide-piece, which is guided in a smooth passage which extends longitudinally along the center column $A^1$, and takes hold of the lower end of the saw. The saw is marked M. Its upper end is connected to an extension, T, from a corresponding piece guided in the hollow axis of the head or upper column $A^2$. Slots in the sides of the columns $A^1$ $A^2$ allow suitable cross-pieces $s$ $t$ to extend out and rest, as represented, against loosely-embracing rings $d^1$ $d^2$, carried on the levers $D^1$ $D^2$, which are connected at their outer ends by the cord or link C, and by means thereof maintain the proper tension or strain on the saw, while it is vibrating by the action of the pitman below.

My machine may have all the ordinary facilities for slackening and tightening the tension, shipping and unshipping the saw, sustaining the slender saw against side strains, holding the wood against being lifted, and the like devices as are used in other approved forms of jig-saws.

It is important that the upper column $A^2$ be supported directly over or in line with the lower column $A^1$, and that both be fixed in position relatively to each other and to the points of the compass. In other words, it is desired that while the frame B, with its levers and connections, is swung around in all positions during the working of the saw, not only the lower column $A^1$ and the table A, but also the upper column or head-support $A^2$, shall remain in a fixed position. This is accomplished through the medium of the shafting I J and the beveled wheels mounted thereon, which gear into each other and into gear-wheels $a^1$ $a^2$, fixed, respectively, on the columns $A^1$ $A^2$. The shafts I and J are supported on the swinging frame B by means of suitable brackets. When the frame B and its connections is swung in either direction, the gear-wheel $I^1$, on the lower end of the shaft I, is compelled to turn by the action of its teeth in the teeth of the wheel $a^1$. This induces a corresponding action between the wheel $I^2$ and the wheel $J^1$, and this communicates a corresponding motion to the shaft J, and this, by means of the wheel $J^2$ on its upper extremity (the teeth of which mesh into the wheel $a^2$) communicates a corresponding relative motion to the latter. The wheels $a^1$ $a^2$ are of equal size, and contain the same number of teeth. The wheels $I^1$ $I^2$ and $J^1$ $J^2$ are all equal in size and in number of teeth. Being carefully cut or otherwise nicely adapted to each other, so as to allow little lost motion, it follows from the action of the several gears that the frame B may be swung around at will in all positions, while the upper gear $a^2$, and consequently the upper head-support $A^2$, will maintain a fixed position, subject only to whatever looseness and trembling motion may be incident to the peculiar manner of mounting it, and of turning it, or rather of preventing it from turning. With reasonably good workmanship little shaking or springing of the upper head need be experienced, and the saw will be driven and adjusted in the head thus fixed exactly as if it were fixed on a stout beam or other suitable support above.

It is not essential that the connecting-shafts I J be mounted at the precise angles represented, or that the gear-wheels be of any particular size or arrangement. The connections here shown as two shafts, I and J, may be constructed in three shafts geared together, thus approximating more nearly to the curve of the frame B; or a pitch-chain, (by which I mean a chain formed of a number of links riveted together so as to form a flexible connection,) operating like a band or belt, may be guided in suitable guide-pulleys along the curved frame B, and made to engage with teeth or projecting spurs or corresponding recesses in the column $A^1$ and in the upper head $A^2$. It is only essential that the connections I J shall be such as shall hold the head $A^2$ in a uniform position corresponding to that of the bed-work while being itself swung around with the frame B in any desired position.

I claim as my invention—

In combination with the fixed support $A^1$ and saw M, working in a uniform position relatively thereto, the swinging frame B carrying the saw-supporting devices, and the upper head $A^2$, with the train of connections I and J, holding the upper head $A^2$ against rotating, while the frame B and the connections are swung around, as herein specified.

In testimony whereof I have hereunto set my hand this 16th day of March, 1874, in the presence of two subscribing witnesses.

CHARLES A. FENNER.

Witnesses:
JOHN O. FISH,
A. H. SIMMONS.